United States Patent [19]

Klindera

[11] Patent Number: 4,675,158

[45] Date of Patent: Jun. 23, 1987

[54] MERCAPTOBENZOTHIAZOLE AND TOLYLTRIAZOLE CORROSION INHIBITING COMPOSITIONS

[75] Inventor: William M. Klindera, Bixby, Okla.

[73] Assignee: Calgon Corporation, Pittsburgh, Pa.

[21] Appl. No.: 760,383

[22] Filed: Jul. 30, 1985

[51] Int. Cl.⁴ .................... C23F 11/04; C09K 3/00
[52] U.S. Cl. ................................. 422/16; 252/391; 252/390
[58] Field of Search ................ 422/16; 252/390, 391

[56] References Cited

U.S. PATENT DOCUMENTS

| | | | |
|---|---|---|---|
| 3,959,166 | 5/1976 | Oberhofer et al. | 252/146 |
| 3,962,109 | 6/1976 | Oberhofer et al. | 252/387 X |
| 4,018,701 | 4/1977 | Ralston et al. | 252/389 A |
| 4,217,216 | 8/1980 | Lipinski | 210/58 |
| 4,219,433 | 8/1980 | Manabe et al. | 422/16 X |
| 4,246,030 | 1/1981 | Lipinski | 106/14.12 |
| 4,545,925 | 10/1985 | Bosen et al. | 422/16 X |
| 4,564,465 | 1/1986 | Bibber | 252/391 X |

FOREIGN PATENT DOCUMENTS 1402880  8/1975  United Kingdom ............ 252/389.3

OTHER PUBLICATIONS

Japanese Patent Office, *Patent Abstracts of Japan*, vol 7, No. 263, No. 58-144479, (Nov. 1983), "Formation of Film on Copper Parts".
Derwent Abstract, No. 83280A/46, "Corrosion-Proofing of Metal Parts in Water" (1978).
Chemical Abstracts, vol. 88 (1978) p. 252, Abstract No. 88: 93573u, O'Neal, Jr. et al., "The Effect of Chlorine . . .".
O'Neal, Jr. et al., "The Effect of Chlorine . . . ", *Materials Performance*, Nov. 1977, pp. 12-16.
Derwent Abstract 20889E/11; "Corrosion Inhibitor for Metal Parts . . . ", Japan No. 570026/071; 7/16/80.
Derwent Abstract 83-780026/40; "Surface Finishing Copper or Copper Alloy . . . "; Japan No. 58144-479A; 2/23/82.
Derwent Abstract 56374Y/32; "Antifreeze Having Reduced Corrosiveness . . . "; Japan No. 52076-241; 12/22/75.
Derwent Abstract 88569B/49; "Corrosion Preventing Composition . . . "; Japan No. 54139-843; 4/24/78.

*Primary Examiner*—John F. Terapane
*Assistant Examiner*—Matthew A. Thexton
*Attorney, Agent, or Firm*—W. C. Mitchell; R. B. Olson; M. C. Sudol, Jr.

[57] ABSTRACT

The present invention is directed to a composition which is useful for inhibiting the corrosion of copper and copper alloy metals in contact with an aqueous system which comprises mercaptobenzothiazole and tolyltriazole.

The present invention is also directed to a method of inhibiting the corrosion of copper and copper alloy metals in contact with an aqueous system comprising maintaining in the aqueous system at least about 0.1 ppm (parts per million) of a composition comprising mercaptobenzothiazole and tolyltriazole.

4 Claims, No Drawings

MERCAPTOBENZOTHIAZOLE AND TOLYLTRIAZOLE CORROSION INHIBITING COMPOSITIONS

BACKGROUND OF THE INVENTION

Mercaptobenzothiazole and tolyltriazole, individually, are well-known copper corrosion inhibitors. It was surprisingly discovered however that the presence of both compounds in aqueous systems provides significantly better corrosion inhibition of copper and copper alloys than either of the components alone.

DESCRIPTION OF THE INVENTION

The present invention is directed to a composition which is useful for inhibiting the corrosion of copper and copper alloy metals in contact with an aqueous system which comprises mercaptobenzothiazole and tolyltriazole.

The present invention is also directed to a method of inhibiting the corrosion of copper and copper alloy metals in contact with an aqueous system comprising maintaining in the aqueous system at least about 0.1 ppm (parts per million) of a composition comprising mercaptobenzothiazole and tolyltriazole.

The compositions of the present invention effectively inhibit the corrosion of copper and copper alloy metals when maintained in an aqueous system in contact with copper and copper alloy metals at a concentration of at least about 0.1 ppm, preferably about 0.5 to 100 ppm and most preferably 1-10 ppm. Maximum concentrations are determined by the economic considerations of the particular application.

Although any combination of mercaptobenzothiazole and tolyltriazole may be used, compositions having a mercaptobenzothiazole: tolyltriazole weight ratio of 1:3 to 3:2 are especially synergistic. The preferred MBT:TT weight ratio is 1:1.5 to 1.5:1.

EXAMPLES

Copper corrosion tests were conducted in water containing 0.083% by weight sodium chloride (500 ppm Cl$^-$) at 50° C. and a pH of 7.0 under full aeration. The corrosion rates shown in the tables were obtained using 443 admirality brass coupons and are expressed in mils per year (mpy).

Corrosion rate data for the examples was obtained using an electrochemical technique known as Linear Polarization. By this technique, the metal of interest is polarized ±10 mV and the current produced is measured as a function of potential. The slope of the i vs. E trace is the polarization resistance, Rp, which is inversely proportional to the corrosion current, $i_{corr}$. The corrosion current is converted from coul-sec$^{-1}$-cm$^{-2}$ to mpy using Faraday's Law. This is a comparative test and data produced is most accurately interpreted as percent improvement, or percent inhibition. Coupons were tested in a 0.083%, by weight, NaCl solution at 50° C., with the pH adjusted to 7.0. Coupon preparation consisted of metallographic polishing to a 1.0u finish followed by ultrasonic cleaning in acetone to insure complete grease and oxide removal.

To obtain the synergism data, the coupons were aerated for 24 hours in the presence of the inhibitor blend being tested. The corrosion rate was measured after 24 hours. Chlorine was added as reagent grade sodium hypochlorite, and corrosion rates were again measured in three hours. The beakers were sealed and unstirred during this three hour residence time, and total chlorine dropped to about 90% of the original concentration. Chlorine levels were measured using amperometric titration. The admirality brass coupons had the following composition, by weight:

Copper: 70.85%
Zinc: 27.96
Lead: 0.01
Iron: 0.02
Tin: 1.11
Arsenic: 0.05

EXAMPLES 1-8

These examples demonstrate the synergistic benefit of MBT/TT compositions on copper corrosion, with and without chlorination.

TABLE 1

| Example No. | MBT:TT Ratio | Corrosion Rate (mpy) | Corrosion Rate After 3 Hour Chlorination at 1.0 ppm Chlorine (mpy) |
| --- | --- | --- | --- |
| 1* | No Inhibitor | 0.54 | — |
| 2* | 0.0 ppm MBT:2.0 ppm TT | 0.0085 | .0095 |
| 3 | 0.4 ppm MBT:1.6 ppm TT | 0.0080 | .0090 |
| 4 | 0.8 ppm MBT:1.2 ppm TT | 0.0060 | .0070 |
| 5 | 1.0 ppm MBT:1.0 ppm TT | 0.0050 | .0060 |
| 8* | 2.0 ppm MBT:0.0 ppm TT | 0.29 | .36 |

*Comparison Examples

The improved inhibition of MBT:TT blends in an aggressive aqueous system containing 500 ppm of Cl$^-$ ions is surprising and unexpected. It is noteworthy that no synergism was found in aqueous systems containing 3.0% NaCl (simulating sea water).

What we claim is:

1. A composition useful for inhibiting corrosion of copper and copper alloys in contact with an aqueous system, which consists of mercaptobenzothiazole and tolyltriazole, wherein the ratio of mercaptobenzothiazole to tolyltriazole is about 1:1, by weight, and wherein said aqueous system is at a pH of about 7.0.

2. A method of inhibiting corrosion of copper and copper alloys in contact with an aqueous system, comprising maintaining in said aqueous system at least about 0.1 ppm of a composition consisting of mercaptobenzothiazole and tolyltriazole, wherein the ratio of mercaptobenzothiazole to tolyltriazole is about 1:1, by weight, wherein said aqueous system is at a pH of about 7.0 and wherein said aqueous system contains less than 500 ppm Cl$^-$.

3. The method of claim 2, wherein about 0.5 to 100 ppm of said composition is maintained in said system.

4. The method of claim 2, wherein about 1.0 to 10 ppm of said composition is maintained in said system.

* * * * *